US010789173B2

(12) United States Patent
Loreskar et al.

(10) Patent No.: US 10,789,173 B2
(45) Date of Patent: Sep. 29, 2020

(54) INSTALLING OR UPDATING SOFTWARE USING ADDRESS LAYOUT VARYING PROCESS (71) Applicant: Trustonic Limited, Cambridge (GB)

(72) Inventors: Chris Loreskar, Cambridge (GB); Nicholas Schutt, Cambridge (GB); Thomas Nyman, Cambridge (GB)

(73) Assignee: Trustonic Limited, Cambridge (GB)

( * ) Notice: Subject to any disclaimer, the term of this patent is extended or adjusted under 35 U.S.C. 154(b) by 20 days.

(21) Appl. No.: 16/192,920

(22) Filed: Nov. 16, 2018

(65) Prior Publication Data
US 2019/0155743 A1 May 23, 2019

(30) Foreign Application Priority Data

Nov. 20, 2017 (GB) .................................... 1719209.7

(51) Int. Cl.
*G06F 12/10* (2016.01)
*G06F 12/14* (2006.01)
*G06F 21/57* (2013.01)

(52) U.S. Cl.
CPC .............. *G06F 12/10* (2013.01); *G06F 12/14* (2013.01); *G06F 12/1408* (2013.01); *G06F 21/575* (2013.01); *G06F 2212/1041* (2013.01); *G06F 2212/1052* (2013.01)

(58) Field of Classification Search
CPC .................................. G06F 12/10; G06F 12/14
USPC .................................................. 717/168–178
See application file for complete search history.

(56) References Cited

U.S. PATENT DOCUMENTS

| 7,657,886 | B1 * | 2/2010 | Chen ........................ G06F 8/65 711/202 |
| 7,770,165 | B2 * | 8/2010 | Olson ................. G06F 9/44589 717/168 |
| 8,621,169 | B2 * | 12/2013 | Whitehouse .............. G06F 8/65 711/165 |
| 9,147,070 | B2 * | 9/2015 | Panchenko ............. G06F 21/14 |
| 2010/0070549 | A1 * | 3/2010 | Nagaraj .................... G06F 7/58 708/254 |
| 2016/0299765 | A1 * | 10/2016 | Wesie ................... G06F 9/4401 |

(Continued)

OTHER PUBLICATIONS

Segal, Mark E., and Ophir Frieder. "Dynamically updating distributed software: supporting change in uncertain and mistrustful environnnents.";Proceedings. Conference on Software Maintenance-1989. IEEE, 1989.pp. 254-261 (Year: 1989).*

(Continued)

*Primary Examiner* — Satish Rampuria
(74) *Attorney, Agent, or Firm* — Nixon & Vanderyhe P.C.

(57) ABSTRACT

A method is provided for installing or updating software on an electronic device 2 comprising processing circuitry 4 and memory access circuitry 10 to control access to at least one memory unit 6, 8 in response to physically-addressed memory access requests issued by the processing circuitry specifying physical addresses from a physical address space. The method comprises performing an address layout varying process comprising: obtaining at least one seed value; in dependence on the at least one seed value, selecting one of a plurality of software address layouts for code or data associated with the software, each software address layout corresponding to a different layout of the code or data in the physical address space; and triggering the electronic device to write the code or data associated with the software to locations of said at least one memory unit corresponding to the selected software address layout.

18 Claims, 8 Drawing Sheets

(56) References Cited

U.S. PATENT DOCUMENTS

2017/0286674 A1 10/2017 Gathala et al.
2019/0114401 A1* 4/2019 De .................. G06F 21/125

OTHER PUBLICATIONS

Kallahalla, Mahesh, et al. "SoftUDC: A software-based data center for utility connputing.";Computer;37.11 (2004): pp. 38-46. (Year: 2004).*

Ruckebusch, Peter, et al. "Gitar: Generic extension for internet-of-things architectures enabling dynamic updates of network and application nnodules.";Ad Hoc Networks;36 (2016): pp. 127-151. (Year: 2016).*

Basdere, Bahadir, and Guenther Seliger. "Disassembly factories for electrical and electronic products to recover resources in product and material cycles." Environmental science & technology 37.23 (2003): pp. 5354-5362. (Year: 2003).*

Whittaker, Steve, and Heinrich Schwarz. "Meetings of the board: The impact of scheduling medium on long term group coordination in software development." Computer Supported Cooperative Work (CSCW) 8.3 (1999): pp. 175-205. (Year: 1999).*

Niinimäki, Jaakko, and Jari Forsström. "Approaches for certification of electronic prescription software." International journal of medical informatics 47.3 (1997): pp. 175-182. (Year: 1997).*

Combined Search and Examination Report for GB Application No. 1719209.7 dated May 8, 2018, 6 pages.

Extended European Search Report for EP Application No. 18206846.0 dated Apr. 12, 2019, 9 pages.

K. Braden et al, "Leakage-Resilient Layout Randomization for Mobile Devices" NDSS '16, Feb. 21-24, 2016, pp. 1-15.

P. Larsen et al, "SoK: Automated Software Diversity" 2014 IEEE Symposium on Security and Privacy, May 18, 2014, pp. 276-291.

A. Holler et al, "Patterns for Automated Software Diversity to Support Security and Reliability" EuroPloP '15, Jul. 8-12, 2015, pp. 1-13.

* cited by examiner

INSTALLING OR UPDATING SOFTWARE USING ADDRESS LAYOUT VARYING PROCESS

This application claims priority to GB Patent Application No. 1719209.7 filed 20 Nov. 2017, the entire contents of which is hereby incorporated by reference.

The present technique relates to the field of electronic devices.

With the increasing development of the Internet of Things (IoT), it is becoming more common for many relatively low power and resource-constrained electronic devices to be connected to the Internet. For example such IoT-type devices may include sensors which provide sensor information such as temperature data or proximity information indicating whether a user is present, which can be used for controlling everyday systems such as heating, air conditioning or street lighting for example, or may include controllers or actuators for controlling such systems based on captured sensor data. Such devices connected to the Internet may pose a major threat if they can be subverted by remote attackers for malicious purposes, for example being used as remote-controlled hosts in botnets or as an attack vector against a larger system that the devices are part of. Often, such an attack may exploit a flaw that exists in the configuration of a vulnerable device that can be exploited for malicious purposes. Such flaws may typically be reproduced in all devices that share that vulnerable software version or device configuration. This would allow exploits which have been developed against one device to be reproduced for any device that shares the vulnerable configuration.

At least some examples provide a method for installing or updating software on an electronic device comprising processing circuitry and memory access circuitry to control access to at least one memory unit in response to physically-addressed memory access requests issued by the processing circuitry specifying physical addresses from a physical address space;
the method comprising performing an address layout varying process comprising:
 obtaining at least one seed value;
 in dependence on the at least one seed value, selecting one of a plurality of software address layouts for code or data associated with the software, each software address layout corresponding to a different layout of the code or data associated with the software in the physical address space; and
 triggering the electronic device to write the code or data associated with the software to locations of said at least one memory unit corresponding to the selected software address layout.

At least some examples provide a computer program for controlling a data processing apparatus to perform the method described above. A storage medium may store the computer program. The storage medium may be a non-transitory storage medium.

At least some examples provide an apparatus comprising processing circuitry, and a storage medium which stores a computer program for controlling the processing circuitry to perform the method described above.

Further aspects, features and advantages of the present technique will be apparent from the following description of examples, which is to be read in conjunction with the accompanying drawings, in which.

Some attacks against electronic devices may rely on knowledge of the particular memory addresses used to identify portions of the code or data associated with software installed on the device. One possible defence against such attacks may be to use address space layout randomisation (ASLR), which randomises the base addresses of each program section placed in virtual memory, by changing the virtual-to-physical address mappings used by the processor to refer to the code and data in physical memory. ASLR may typically be performed at runtime so that each time the software is run, the virtual addresses used to refer to parts of the program code and data are different, making an attack against an individual electronic device more difficult. However, for many Internet of Things or embedded devices where resources are extremely constrained, it is relatively common for such smaller devices to operate directly on physical addresses without providing a memory management unit (MMU) or translation lookaside buffer (TLB) to support virtual-to-physical address translation. Therefore, such ASLR techniques are not usable for many IoT-type processing devices.

An electronic device has processing circuitry and memory access circuitry which controls access to at least one memory unit in response to physically-address memory access requests issued by the processing circuitry specifying physical addresses from a physical address space. In the technique discussed below, an address layout varying process is performed for the electronic device (either performed by the device itself, or by another device such as a server). The address layout varying process comprises obtaining at least one seed value, and in dependence upon the at least one seed value, selecting one of a plurality of software address layouts for code or data associated with software to be installed or updated on the device. Each software address layout corresponds to a different layout of the code and/or data associated with the software in the physical address space of the device. The electronic device is triggered to write the code or data associated with the software to locations of the at least one memory unit which correspond with the selected software address layout.

With this approach, the locations at which respective portions of code or data are located within the physical memory can be varied based on the seed value. It may seem that this does not provide particularly strong protection against attacks on an individual device since unlike ASLR performed at run time, the opportunity to vary the actual physical locations at which the code or data are written may be relatively limited, for example on installation or updating of software, rather than on each run time. However, the present technique recognises that in fact there is still a benefit to varying the physical addresses used to store the code or data associated with the software. This is because when a population of electronic devices is provided supporting the address layout varying process as discussed above, then if each device uses a seed value which varies from device to device, different devices may have different software address layouts, so that it is less likely that a runtime attack based on the knowledge of the physical address location of a particular piece of code or data can affect large device populations. An attack relying on fixed addresses can be used to exploit some devices with an identical software configuration, but by dividing the device population into smaller subsets with different software address layouts for the code and data, this increases the resistance of the population of devices as a whole against such attacks, reducing the size of a class break to a smaller size in a controllable manner.

While the address layout varying process may modify the software address layout, which defines which physical addresses are used to store particular portions of the program code and/or data, the memory map defining which physical addresses are mapped to particular regions of memory storage provided in hardware may remain unchanged.

In some examples, the address layout varying process described above can be used on an electronic device which does support virtual-to-physical address translation, e.g. a device comprising a MMU or TLB. In such devices the physical address varying layout process could be used alongside virtual ASLR as discussed above to provide further security.

However, the address layout varying process may be particularly useful for electronic devices in which the processing circuitry comprises address generating circuitry to generate non-translated physical addresses for the physically-addressed memory access requests in response to physical-address-defining operands which are specified by memory access instructions executed by the processing circuitry. Hence, in devices which lack a MMU or TLB providing address translation functionality, the address layout varying process discussed above can be particularly useful to provide a population of devices with resistance against attacks relying on fixed addresses.

Also, the address layout varying process may be particularly useful for electronic devices which execute software directly from execute-in-place storage (e.g. NOR flash memory), rather than copying the software to RAM, because for devices using execute-in-place storage, ASLR would be impractical as the code would be executed directly without virtual-to-physical address translation. Hence, in some examples the processing circuitry may perform execute-in-place (XIP) execution of the software from the at least one memory unit.

The address layout varying process may include updating at least one reference to a physical address in the code or data associated with the software to correspond with the selected software address layout. While some address references in the code or data may be relative addresses which do not need to be updated when the physical location of the code or data is updated (as the relative offset between the reference and the target address may have remained the same), there may be some absolute physical address references in the code or data which would need to change if the physical location of the target of those address references changes. Also, some relative addresses may also need to be updated, e.g. if the order of respective portions of program code or data changes, the relative offset of a target address in one portion with respect to an address reference made from another portion may change. Hence, by updating at least one reference to a physical address in the code or data (which could be an absolute reference or a relative reference) to correspond with the selected software address layout, the code or data can continue to function correctly even if its physical locations are varied by the address layout varying process.

There may be different ways of varying the software address layout based on the seed value. In one example the address layout variation may comprise selecting one of a number of potential address offsets based on at least one seed value. In the selected software address layout, a start address of a region of the physical address space used to store at least part of the code or data associated with the software may be offset from a base address by the selected address offset. Hence, in different devices different seed values can be used and so the code or data in each device may be offset from the base address by different amounts, so that it is harder for an attacker to predict the physical address at which a given piece of code is stored in any given device of the population.

Another way of varying the software address layout may be to provide at least two software address layouts which correspond to different orders in which respective portions of the code or data associated with the software are arranged within the software address layout. Hence, the address layout varying process may for example include swapping the order of different portions of the code or data, so that the population of devices can be divided into smaller sub-groups which have the code or data arranged in different orders. For example this can be useful for code written in a modular manner where there are certain distinct portions of the code or data which can easily be separated from one another and reordered.

In some examples the two techniques discussed above can be combined. For example, when reordering the portions of the code or data, the overall block of code or data comprising the reordered portions could also be offset from a start address by an address offset selected based on the seed value. Alternatively, within each of the reordered portions a further offset could be applied to offset that portion relative to a corresponding start address.

The at least one seed value is used as the source of entropy for distinguishing the address layouts used by different devices. In some examples, a single seed value may control the address layout varying process. Alternatively, two or more seed values may be used to control the address layout varying process, with each seed value influencing a different part of the address layout variation (e.g. one seed value controlling the selection of the order of the code or data portions and another seed value controlling the address offset, or different seed values controlling different offsets applied to different portions of the code or data).

The address layout varying process could be used for any software to be installed or updated on the electronic device. However it can be particularly useful when the software comprises device firmware for the electronic device. The device firmware may provide the software code for controlling certain low level functions of the device such as controlling hardware units, or may provide the operating system for the electronic device. If an attacker can exploit vulnerabilities in the device firmware, then there may be more significant consequences than if an application running on top of the firmware is compromised. Hence, by applying the address layout varying process to the device firmware, this can reduce the likelihood that an attacker can mount a significant attack on a large population of devices.

In some embodiments, the software may comprise monolithic software which comprises a single software image providing all the software functionality to be executed by the electronic device. For a microcontroller or relatively low-capability Internet of Things type device, all the software to be executed on the device (including any operating system as well as application-type functionality or programs to execute under control of the operating system) is often bundled together as a single monolithic software image, which is all updated or installed as one unit. Such devices can be more vulnerable to attacks relying on fixed address locations of particular pieces of code or data, as the physical addresses at which pieces of code or data are installed may be predetermined by the software update file provided by a server (rather than the operating system on the device selecting the location at which to install the code or data), and so would normally be the same for each device in a batch. By performing the address layout varying process as discussed above, it is less likely that such an attack can affect a large fraction of a population of devices.

The address layout varying process can be performed at different times. The address layout varying process can be performed when first installing the software on the electronic device. For example the address layout varying process could be performed as part of the manufacture process of the electronic device when the software (e.g. device firmware) is first being injected into the device. Also, the address layout varying process could be performed at later instances of installing software. Alternatively or in addition, the address layout varying process could be performed when updating software on the electronic device. For example when a firmware update is applied, the opportunity could be taken to also vary the address layout of the updated firmware.

In some cases the address layout varying process could also be performed when booting the electronic device. This could allow more frequent variation of the software address layouts so that further protection can be provided against an attack on an individual electronic device. The variation at boot time may however be limited to varying code or data which is readable or writeable at boot time, and may not be able to vary the location of read only code or data associated with the software. Hence the boot time variation may be more limited than the install or update time variation. The frequency with which the boot time variation is applied could depend on the type of memory used to store the code/data. For example, if flash memory is used, performing frequent address layout variation could risk wearing out the flash memory more quickly, so the frequency of the address layout variation could be reduced to balance the risk of wear out against the need for security. On the other hand read/write data not stored in flash or a type of memory at risk of wear out could have its physical address location changed more frequently to improve security.

A value which is likely to vary from device to device or from time to time (to provide sufficient entropy) can be used as the at least one seed value. As discussed above in some cases multiple seed values may be used. For example, the seed value could comprise a random or pseudo random number, which could be generated at the time of performing the address layout varying process either by a hardware random number generator or pseudo random number generator within the electronic device itself or securely injected from the outside by an external device. The random number generator or pseudo random number generator could itself use a seed value derived from some property of the device, such as a device-specific identifier or hardware property of the electronic device as discussed below, to generate the seed used for the address layout varying process.

Also, the seed value could comprise an identifier associated with the electronic device. For example the identifier could be a device-specific identifier identifying the particular hardware device, or an identifier associated with the device such as a mobile handset device identifier or IMEI, a MAC address of the device, or any other identifier which is likely to be unique or substantially unique to the electronic device (it is not necessary to be completely unique as long as it is reasonably likely that a significant number of the electronic device in the population will have different values for the identifier).

In another example the seed value can be based on at least one hardware property of the electronic device. For example the seed value could be derived from random hardware characteristics of the electronic device, such as the resistance of certain conducting elements of the device or the capacitance between certain elements. For example the electronic device could have a physical uncloneable function (PUF) circuit which generates an output dependent on certain hardware characteristics of the device which are likely to vary from device to device and are difficult to predict in advance of manufacturing the device as they may depend on random process variation arising during the manufacture of the device.

Also, in some cases the seed value(s) may not be generated by the electronic device, but may be provided by a further device other than the electronic device. While protection of the seed value could be more secure if it is generated inside the device, sometimes the electronic device may not have the capability for generating the seed value itself. For example if the address layout varying process is performed when first installing the software on the electronic device when the device is in the factory, the manufacturing process for making the device may not yet be complete and there may not yet be a reliable source of entropy in the device which could generate a seed value which is sufficiently likely to vary from device to device in a way which provides the desired diversification of the software address layout across a population of devices. In this case, it may be preferred for the manufacturing equipment to securely inject a random or pseudo random seed value into the electronic device rather than using a seed value generated by the device itself.

Regardless of the particular form of seed value used, by using a seed value which is relatively likely to vary from device to device, the population of devices as a whole can be made more robust against the consequences of attack since it is less likely that a successful attack can affect large fractions of the population.

Some electronic devices may support a software authentication function in which authenticity of the software is checked by comparing a calculated authentication value, which is obtained as a function of the code or data stored in a given region of the physical address space, with an expected authentication value. For example the software authentication function may be invoked as part of a secure boot process so that the software on the device can be checked to detect tampering of the software before that software is actually run. For example the expected authentication value may be certified by a trusted provider (such as the party that wrote the software) and the authentication value may be calculated as a hash of the contents of a certain block of physical address space so that the comparison between the calculated authentication value and the expected authentication value can detect if some of the code has been modified. However, if the address layout varying process is applied to such an electronic device, then the variation in the physical addresses at which different portions of code or data are stored may lead to the authentication value calculated as part of the software authentication function being different depending on the selected software address layout. This could lead to a mismatch in the expected authentication value and the calculated authentication value even if the code or data has not otherwise been modified other than the reordering or relocation of the code within the physical address space. Hence, to allow such software authentication functions to operate correctly, the address layout varying process may also comprise updating the expected authentication value to correspond with the selected software address layout for the software. For example, after the code or data has been written to the memory locations corresponding to the newly selected software address layout, the expected authentication value could be re-computed and stored to permit comparisons against a calculated authentication value when the software authentication function is later executed.

Some software authentication functions may involve verification of a signature provided by a trusted source of the software. If the software address layout of the software is varied and the expected authentication value re-calculated on the electronic device, the electronic device may not have the proper key which would enable the correct signature to be generated. Hence, in some cases the electronic device may implement a separate authentication mechanism for verifying that a recomputed authentication value was computed by a trusted source on the device itself. For example, the trusted component responsible for recomputing the authentication value could generate a signature based on a secret key for verifying that the recomputed authentication value can be trusted.

Alternatively, instead of recomputing the expected authentication value, following the address layout varying process, unrolling information could be stored specifying how to unroll the changes made to the software address layout so that the original software address layout can be reconstructed from the actual software address layout resulting from the address layout varying process. During the software authentication function, the calculated authentication value may then be calculated based on the reconstructed software address layout and compared with the original expected authentication value that was expected for the original address layout before any variation was applied. Also, any signature associated with the original address layout can be verified. The unrolling information may be signed by the electronic device and the signature verified before performing the unrolling during software authentication, to guard against circumvention of the software authentication function by injecting false unrolling information not generated by the device itself during the address layout varying process.

Alternatively, if the software authentication function performs separate verification of signatures/authentication values for two or more portions of the program code/data, then rearranging the order of portions would not affect the matching between the calculated and expected authentication values for each portions. Hence, for some implementations of the software authentication function and software address layout variation. It may not be necessary to adapt the software authentication function regardless of the software address layout which is selected.

In some examples, the address layout varying process may be performed by the electronic device itself. Hence, the electronic device may receive an update file which specifies the code or data to be installed or updated, and in response a component executed by the electronic device may control the device to obtain the seed value, select the software address layout to be used and write the code or data to memory according to the selected software address layout.

In some examples, the electronic device may have a hardware architecture which provides a secure operating environment and a normal operating environment, in which code or data associated with the secure operating environment are protected from access by code executed in the normal operating environment. In this case it can be useful to have the address layout varying process controlled by code executed in the secure operating environment. This can provide some additional protection, for example protecting against an attacker being able to detect the seed value used for the address layout varying process so it could be less likely that an attacker can deduce or control the software address layout which was selected for a given device.

In other examples the address layout varying process may not be performed on the electronic device itself, but could itself be performed by a server. The server could generate a software update file comprising the code or the data associated with the software which is arranged according to the selected software address layout, having previously selected the software address layout for a given electronic device according to a seed value. The server can then transmit the generated software update file to the electronic device to trigger the electronic device to write the code or data to locations of the at least one memory unit corresponding to the selected software address layout. In this case, the electronic device itself could simply install the received code or data at some fixed physical address location within its physical address space but the server may have generated the software update file so that the physical locations of code or data are varied and different devices are sent different software update files with different software address layouts. In the case where the software address layout variation is controlled by applying offsets as discussed above, the server could include some padding in the software update file so that some dummy data will be written to parts of the physical address space by the electronic device so that the actual code or data will start from a different physical address depending on the size of the padding region of dummy data included by the server in the software update file.

Figure 1:
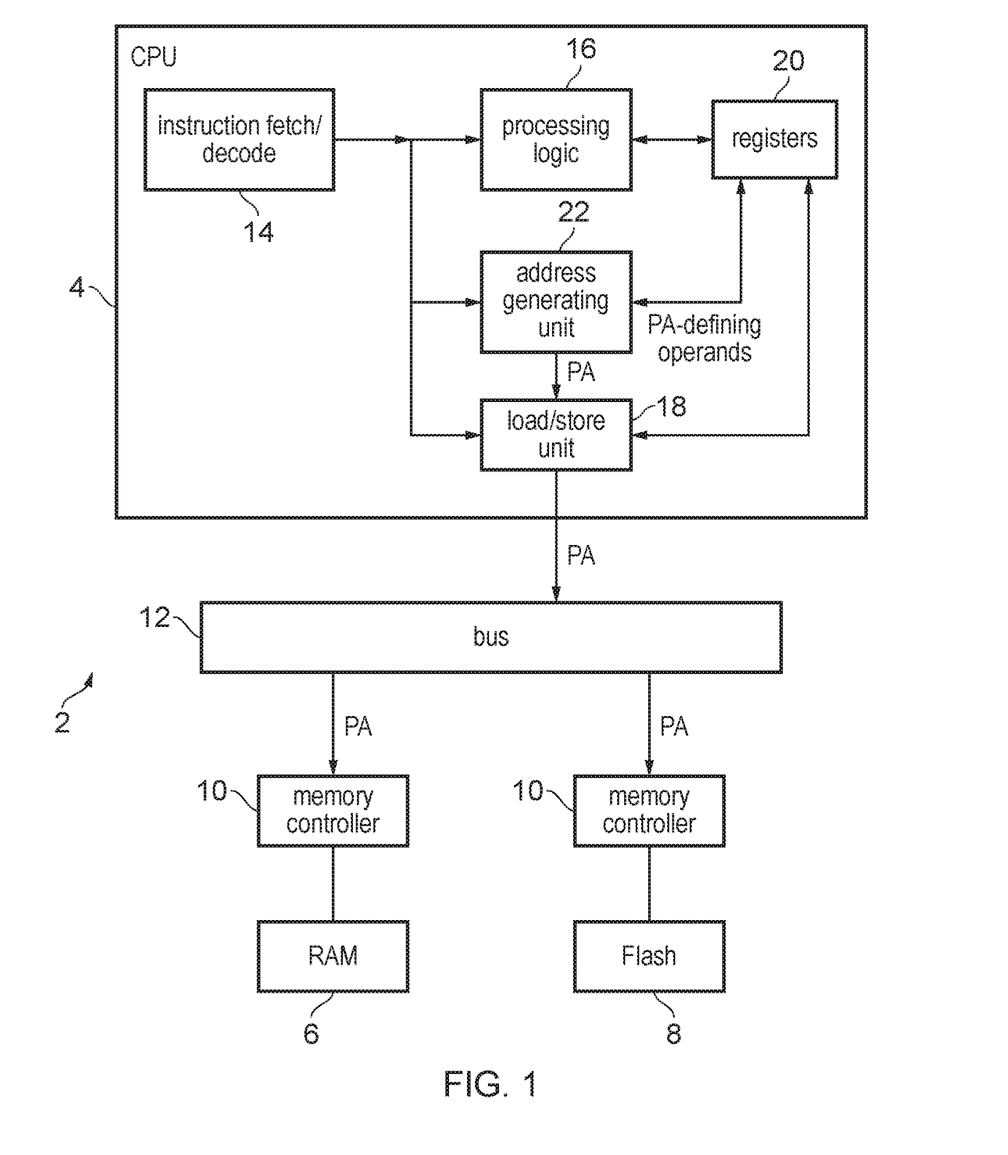
FIG. 1 schematically illustrates an example of an electronic device.

FIG. 1 schematically illustrates an example of an electronic device 2 comprising a processor 4 (e.g. a central processing unit or CPU), and at least one memory unit 6, 8 for storing data or code to be accessed by the processor. For example, two or more different memory units may be provided, for example volatile random access memory (RAM) 6 and non-volatile memory 8, e.g. flash memory. It will be appreciated that different types of memory technology could be used for the various memory units and that in some examples multiple units of the same type could be provided. Each memory unit has a corresponding memory controller 10 which acts as memory access circuitry to control access to the memory unit based on physically addressed memory access requests issued by the processor 4. The access requests specify physical addresses which directly identify corresponding locations in one of the memory units 6, 8. While FIG. 1 shows a separate memory controller 10 for each memory unit, in other examples a single memory controller could control access to multiple memory units. A bus 12 is provided to exchange memory access transactions between the processor 4 and the memory controllers 10. While not shown in FIG. 1 for conciseness, the bus may also be connected to other master devices, such as a further processor (e.g. another CPU or graphics processing unit), or a display controller, or to slave devices such as peripheral input/output units etc. It will be appreciated that FIG. 1 is a simplified representation of an electronic device which does not show all possible components of the device. Depending on the purpose of the device the device could also comprise other elements, such as sensors for detecting sensor data, e.g. temperature or pressure sensors, control actuators for controlling some physical system such as a heating system or lighting system, user input elements for accepting user input, and/or a communications unit for communicating with external devices over a network.

In this example the processor 4 has no hardware capability for virtual-to-physical address translation. Hence, instruction fetch and decode circuitry 14 fetches and decodes instructions fetched from a cache or memory and issues those instructions to one or more execution units for execution. For example the execution units may include processing logic 16 for preforming data processing operations, such as arithmetic or logical operations, or a load/store unit 18 for controlling load operations to load data from the memory system to registers 20 or store data from the registers of the CPU 4 to memory.

The CPU 4 has an address generating unit 22 which generates the addresses to be used for load/store operations. While the address generating unit 22 is shown as a separate unit from the processing logic 16 and the load/store unit 18 in the example of FIG. 1, in other embodiments the address generating unit 22 could be considered part of the processing logic 16 itself, or part of the load/store unit 18. The address generating unit generates the physical addresses to be used for memory access transactions depending on physical-address-defining operands which are specified by load/store instructions decoded by the instruction decoder 14. For example, the instructions may specify a base address and an offset, and the address generator unit 22 may add the offset to the base address to identify the physical address to be used for a corresponding load or store operation.

In some processors, the operands defined by the load/store write instructions may represent virtual addresses and so the address generating unit may output a virtual address which does not directly identify corresponding locations in the memory unit 6, 8. A memory management unit (MMU) or translation lookaside buffer (TLB) may then translate those virtual addresses into physical addresses which are then output to the memory system. However, for many IoT-class devices which are relatively power- and resource-constrained, the overhead or providing an MMU or TLB may not be justified. Often some IoT-class devices may be intended only to execute a very limited set of processing functions, and the code executed by the device may be carefully controlled by a single provider so that it is less likely that arbitrary user-selected code is installed, making it feasible to ensure that different pieces of code executed by the processor 4 do not specify overlapping addresses which require address translation in order to map them onto different portions of the physical address space of the memory system. Hence, in embodiments such as shown in FIG. 1, the device lacks an MMU and TLB and instead the address generating unit 22 directly generates physical addresses in response to the operands of the load/store instructions so that no address translation functionality is provided in hardware.

Firmware for resource constrained embedded devices is typically developed in C and other memory unsafe programming languages, which may leave the devices susceptible to memory corruption vulnerabilities. Even if a device employs modern platform security measures, such as secure boot, hardware Root of Trust, device attestation, and lightweight hardware security architectures, such memory corruption vulnerabilities may leave the device firmware susceptible to runtime exploitation such as code-reuse attacks. The risk of such runtime exploitation is exacerbated in Internet connected devices by the attack surface exposed to remote attackers. Traditional software security measures, such as module or thread-level isolation can limit the effects of exposure to certain software components of the device, but compromise of privileged software on the device would allow a remote attacker to take control of a device, causing it to misbehave. As an example, vulnerable IoT devices are prominent in several botnets used to mount distributed denial of service attacks.

One defence against modern runtime exploitation of native software in PC's, mobile devices and other general purpose computing platforms is Address Space Layout Randomization (ASLR). ASLR operates by randomizing the base addresses of each program section placed in virtual memory, including the program image, program data, heap, stack, shared libraries Process Environment Block/Thread Environment Block (Windows) and Virtual Dynamic Shared Object (Linux). The randomization is typically performed on the virtual address space assigned to the program instance upon program execution, making the memory layout of the executed program instance subtly different. As such, ASLR relies on the presence of a Memory Management Unit (MMU), as well as software support in the operating system kernel and the program loader. Some ASLR schemes also perform re-randomization of the memory layout at runtime in order to lessen the impact of information disclosure, e.g. leaked pointer addresses, that may be used by an attacker to infer the randomized memory layout and thus effectively bypass ASLR-based defences. Such runtime re-randomization typically requires some form of inline instrumentation of the randomized binaries to enable self-adjustment of memory addresses stored by the program at runtime (self-randomization).

This proposal outlines a technique for address layout variation (binary diversification) of software images targeting resource constrained embedded devices that lack virtual address space mapping provided by an MMU, for preventing runtime attacks affecting large device populations. An attack relying on fixed addresses can be used to exploit all devices with an identical software configuration, e.g. a particular software version. By dividing the device population into smaller subsets which are resistant against a particular configuration of the attack, the number of vulnerable devices can be lowered according to specific factors (see below). While this approach will not necessarily thwart a sophisticated and motivated attacker trying to break a specific device, it reduces the size of a class break to a smaller size in a controllable manner.

Figure 2:
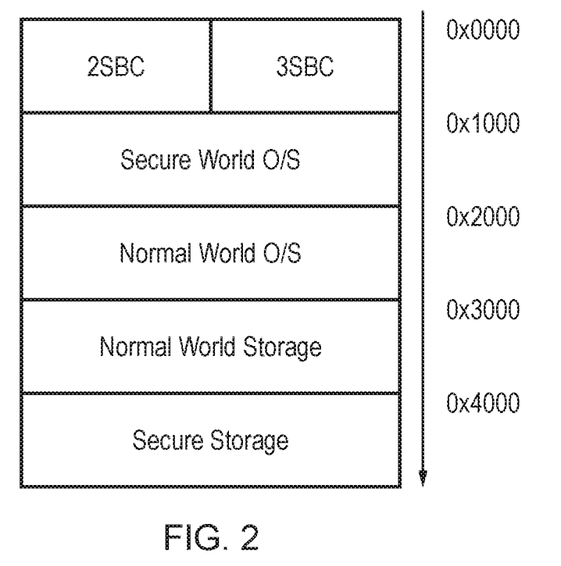
FIG. 2 shows an example of a software address layout for program code or data associated with software installed on the electronic device.

The firmware of applicable embedded devices typically consists of a distinct monolithic binary placed at a fixed address in non-volatile storage, such as execute-in-place flash memory. The firmware program is either linked to be aware of the address the storage appears at in the system, or is position-independent. On devices that support secure boot, the initial bootstrap code is contained in dedicated read-only memory, (e.g. ROM, EPROM) on the System-on-Chip (SoC) and cannot be changed. The initial bootstrap code verifies the integrity of the next code stage (in e.g. flash) before executing it. The process is repeated for each subsequent firmware binary to ensure the integrity of the device's full software. On devices that employ hardware security architectures, one or more of the stages operate in the processor's "secure state". The secure state firmware is strongly isolated from the "normal state" firmware, which executes later in the boot chain. FIG. 2 depicts an example layout of the non-volatile program storage of such an embedded device. The Normal World O/S depicts the device's normal state firmware. The Secure Word O/S depicts the device's secure state firmware. 2SBC and 3SBC depicts the initial boot firmware's second and third boot stages (3SBC might optionally be omitted).

As the starting address of the Normal World O/S in the example in FIG. 2 is fixed at address 0x2000, any exploit targeting a device with this particular software configuration would also be applicable to other device's sharing the same software configuration. In order to prevent an attack against this particular software setup, without altering the Normal World O/S itself, a trusted component in the isolated Secure World O/S can alter the placement of the Normal World O/S during manufacturing, boot time, or during software update procedure. The re-arrangement occurs in three steps:

1. Determine random target memory layout
2. Alter Normal World O/S firmware image location
3. Alter relocation entries in the Normal World O/S to ensure correct operation in new layout Two complementary strategies for diversification of the memory layout are described below:

1. Full-image relocation
2. Image binary re-juggling

Full-Image Relocation

Figure 3:
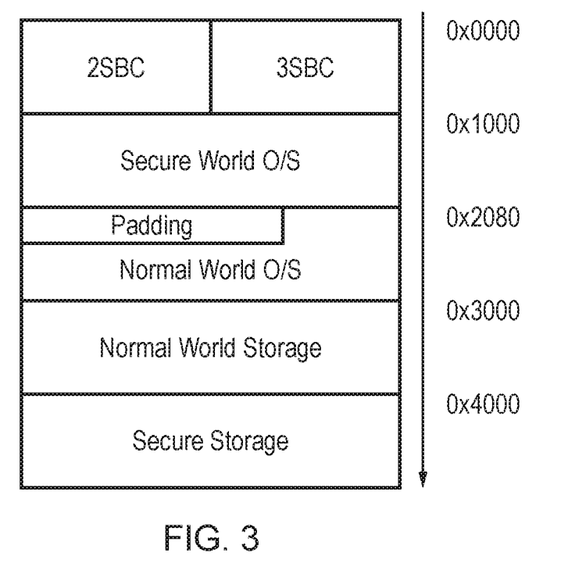
FIG. 3 shows an example of an altered software address layout in which a start address of a portion of code or data is offset from a base address by an amount dependent on a seed value.

The location of the Normal World O/S image is chosen at random from a fixed window. FIG. 3 depicts a diversified memory layout after full-image relocation. The Normal World O/S now starts at memory address 0x2080 (instead of 0x2000). The area marked "Padding" depicts the relocation window (128 bytes in the example). As the space reserved for the relocation window typically must be left unused the additional memory overhead of full-image relocation depends on the size of the relocation window. A larger relocation windows allows for more possible memory layouts after diversification. For instance, assuming a Normal World O/S image aligned at a 2 bytes boundary, a 128 byte relocation windows allows for 64 unique memory layouts. Applied to a device population of 1 million devices, this would break the population into 64 device pools of 15,625 devices each (assuming a uniform completely uniform distribution of devices between pools). Thus, an attacker targeting a device at random has a 1/64 (or 1.56%) probability of guessing the correct memory layout of the targeted device without additional information.

In addition, the software component responsible for performing the diversification adjusts the relocation entries in the Normal World O/S image accordingly to adjust for the new offset. For instance, for Position Independent Code produced by the GNU Compiler Collection, relocation information exists in two sections of the binary image: Global Offset Table (GOT) and Procedure Linkage Table (PLT). During full-image relocation, each affected entry in the GOT and PLT is adjusted.

Binary Re-Juggling

Figure 4:
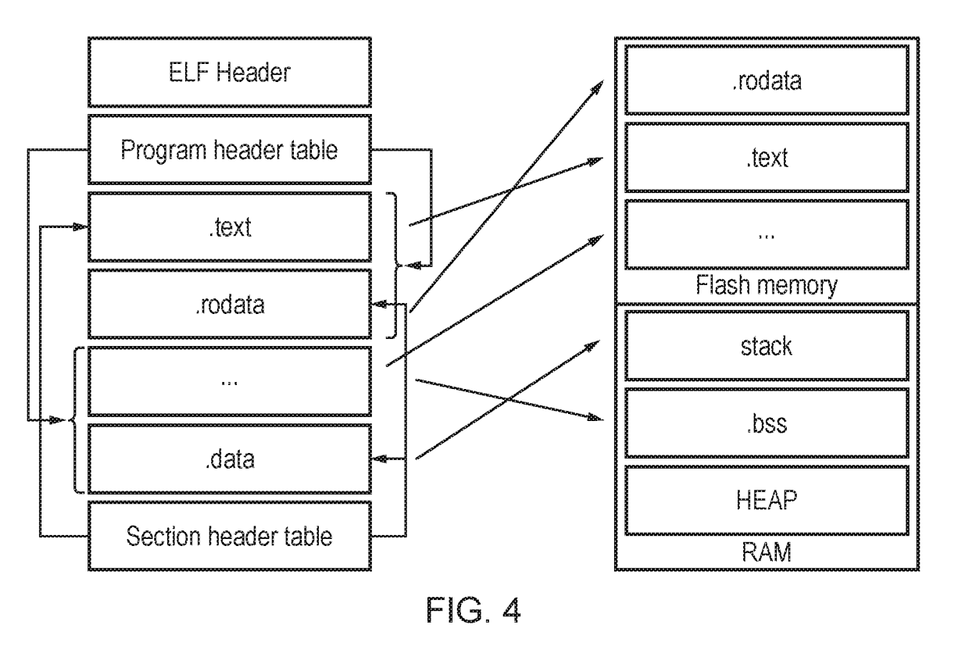
FIG. 4 shows an example of varying the order in which respective portions of the code or data are arranged in the software address layout.

In binary re-juggling, the binary diversification procedure (or "address layout varying process" re-orders individual sections of the program image when placed in memory (persistent as well as RAM). FIG. 4 shows a portion of a typical Executable and Linkable (ELF) format, however it is appreciated that ELF merely depicts an executable format which might be used on a target device. The technique described here would equally apply to other formats as well. An ELF image consists of several smaller pieces (sections). The piece of software responsible for flashing the image to the device (and at updates), juggles around (switches the order of) the pieces of the image that it can and updates the references within it accordingly.

For instance, the .text section might be relocated to physically reside after the .rodata when the software image is persisted on the device's flash. Note that in FIG. 4 only a few sections are depicted in the flash memory box, whilst more might exist (such as the GOT table). The solution becomes stronger (introduces more entropy) as more and more sections are re-organized in the flash. Similarly, the .data section and/or the .bss section (as well as heap and stack) might be randomly situated in RAM upon execution. The destination address in RAM for the stack, heap and other read/write data can be randomized at every boot (in contrast to the read only sections which are persisted once the image is updated), or even at initialization time of a particular software module. Thus, although the depiction implies the read/write data sections are modified once, in reality they can change more often, depending on how the device is configured.

These small alterations, yield extra entropy towards the pool of addressable device when the software later executes. Depending on how the images is re-organized, fixed offsets within exploits would not work anymore.

Combining the effects of the full-image relocation and binary-rejuggling techniques can provide further entropy (randomness) in the address space variation. Image relocation could be utilized within the binary-rejuggling equally, although it would create even further amounts of unused space in the system if the various parts of the affected software images were padded.

Figure 5:
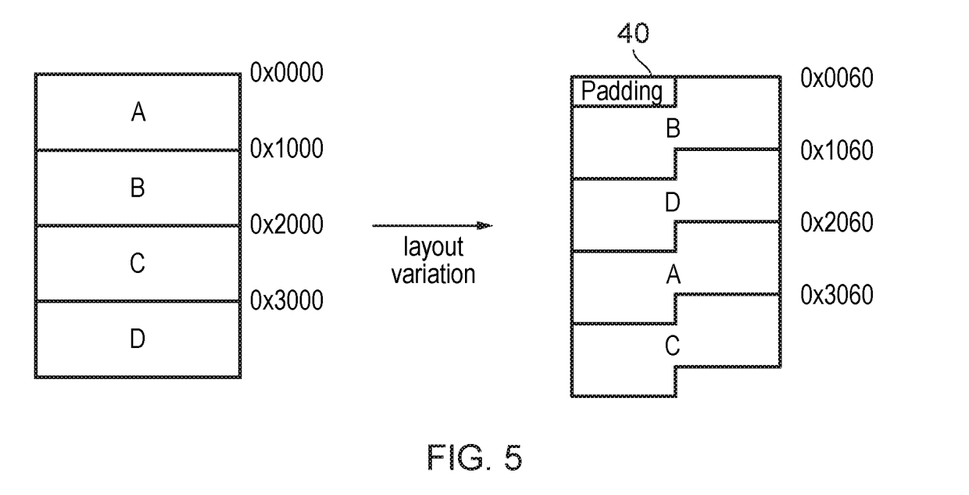
FIGS. 5 and 6 show two examples of combining the techniques of FIGS. 3 and 4 to provide further variation in the software address layout for the code or data of a given piece of software.

Hence, as shown in FIGS. 5 and 6 the examples of FIGS. 3 and 4 can be combined. For example, as shown in FIG. 5, in addition to performing the binary re-juggling of FIG. 4 to change the order in which the respective portions A, B, C, D of code or data are arranged in the physical address space, an offset (padding) 40 can also be applied to the start address of the overall block of code or data as a whole. Hence in this case all of the portions of code shown in FIG. 5 would be offset in the physical address space relative to the default position by a variable offset selected based on the seed value used for the randomisation. Note that padding the start of the first portion B ahead by, say, 0x60 bytes means that the start addresses for subsequent portions D, A, C are also moved on by 0x60 bytes.

Figure 6:
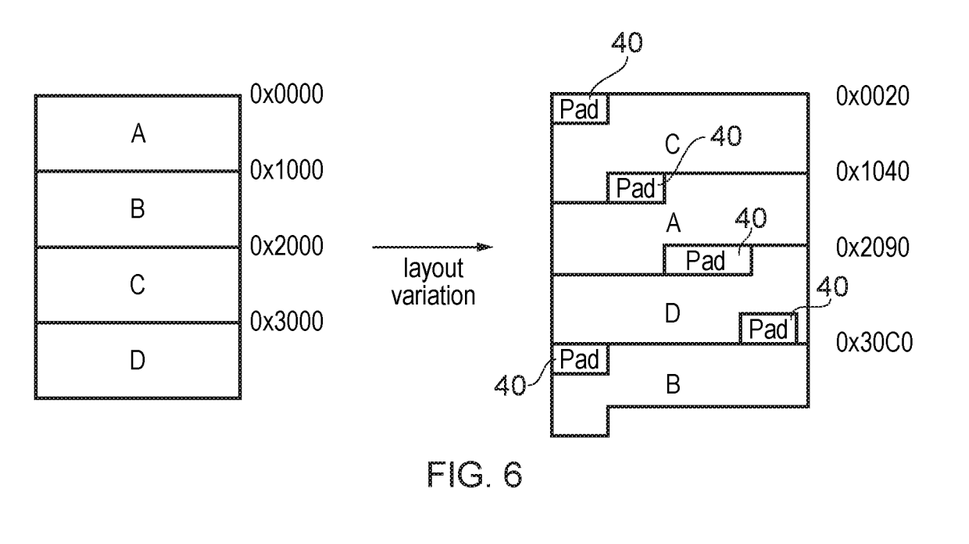

Alternatively as shown in FIG. 6 the offset can be applied individually to each respective portion of the code or data with different amounts of padding applied to different portions, for example selected based on a number of different seed values (e.g. a new random number for each offset and each decision made for the layout variation). This can provide further entropy and variation between the address layout used in different devices to further reduce the fraction of the population of devices which share the same software configuration.

When the device is to be manufactured, the device may be programmed initially at the factory. In order to add some diversification, the Normal World O/S image can thus be left to be altered by the Secure World O/S. Because this happens so early in a device's lifetime a reliable source of entropy may be unavailable. Thus, when the software address layout varying process is performed during the manufacture process, the probing/production station may optionally also inject a random seed into the batch of devices being flashed in order for them to able to produce uniformly distributed configurations for randomization.

Due to the image being re-arranged or otherwise transformed during the update stages, secure boot would break when the binary needs to be loaded, hence the device would be bricked. To rectify that situation, the device would typically use a HMAC based solution (device specific key) and re-protect the software image with a MAC that is used instead at boot time for verification as part of the secure boot chain and simply discard of any previous signature protecting the binary.

Thus, the stages of update are the following:
1. Verify payload (i.e. is the update genuine)
2. Re-arrange the binary as described above
3. Re-protect software image with a new HMAC (recomputing an excepted authentication value to be compared with a hash of a region of physical memory during an authentication function performed in the secure boot process)
4. Write the diversified software update to persistent storage
5. Reboot.

Figure 7:
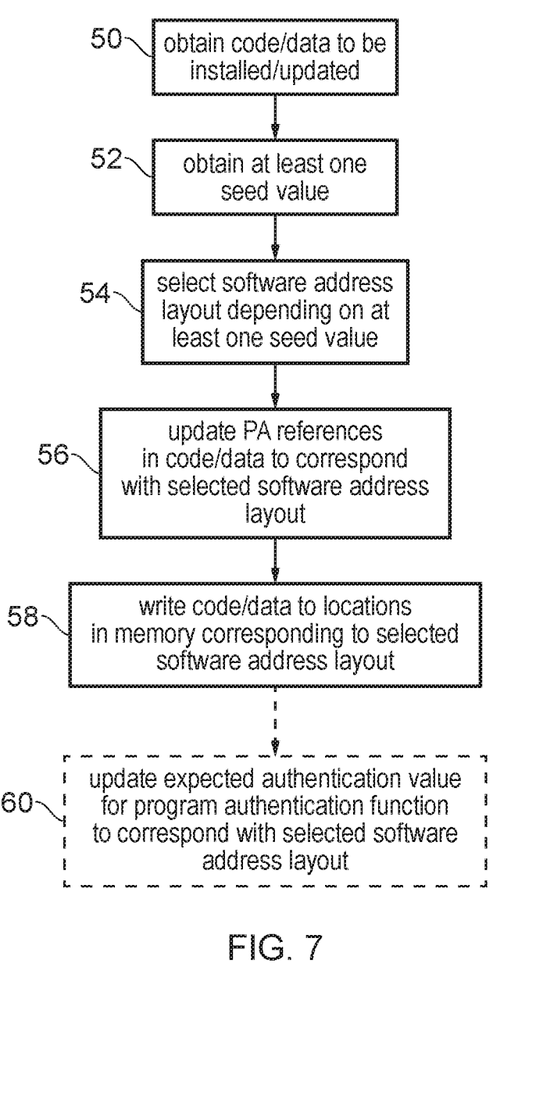
FIG. 7 is a flow diagram illustrating a method of performing an address layout varying process.

FIG. 7 is a flow diagram illustrating a method of performing an address layout varying process. At step 50 the code or data to be installed or updated is obtained, for example within a software update file which could be installed by reading the update file from a disk or storage medium, or by downloading the updated file over the internet. At step 52 at least one seed value is obtained. The seed value can be any value which has a reasonable probability of varying from device to device. For example the seed value could be a random value, a device identifier associated with the electronic device in which the software is to be updated, a hardware-dependent value derived from a hardware property of the device, or a seed value injected from an external device. At step 54 a software address layout is selected from a number of candidate address layouts depending on the at least one seed value selected at step 52. For example the different software address layouts could vary in terms of the order in which respective portions of the code or data appear in physical address space and/or vary in terms of the size of the offset used for a given portion of code or data relative to some default base address. At step 56 any absolute physical address references in the code or data, and if necessary some relative physical address references, are updated to correspond with the selected software address layout so that the code or the data will still function correctly once its physical address locations have changed. At step 58 the electronic device is controlled to write the code or data to locations in memory corresponding to the selected software address layout (having already updated the physical address references in the code or data at step 56). Optionally, at step 60 an expected authentication value used for a software authentication function (such as a secure boot process as discussed above) is updated to correspond to the selected software address layout. For example, the authentication hash may be recomputed based on the updated physical address region used to install the software code or data. Alternatively, at step 60 unrolling information specifying how to reconstruct the original address layout of the software from the varied address layout could be stored (protected by a signature generated by the device), to enable a software authentication function to reconstruct the original address layout when performing a software authentication function. In devices which do not provide such software authentication functions step 60 could be omitted.

Figure 8:
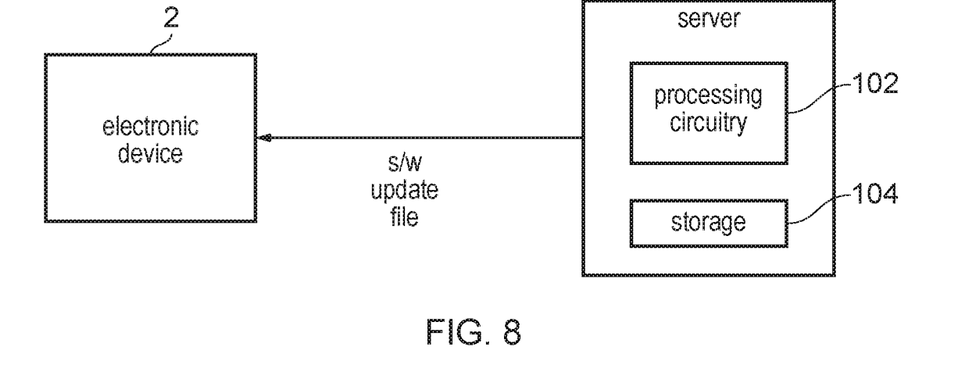
FIG. 8 shows use of the electronic device in conjunction with a server which provides a software update file for installing or updating a piece of software on the device.

As shown in FIG. 8, the electronic device 2 may in some examples obtain the software update file by downloading it over the Internet from a server 100 which comprises processing circuitry 102 and storage circuitry 104 storing software or data to be used by the processing circuitry 102. In this case, the address layout varying process discussed above could be implemented at the electronic device or at the server 100.

Figure 9:
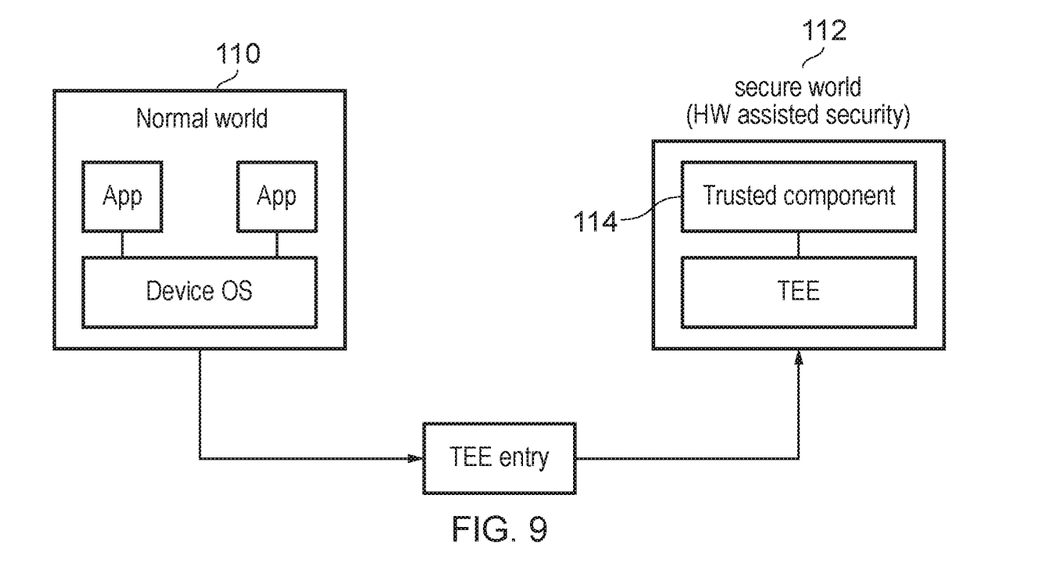
FIG. 9 illustrates an example of a hardware architecture providing a secure operating environment and a normal operating environment.

In cases where the process is controlled by the electronic device 4, in some implementation the device may support a hardware architecture which provides a normal execution environment 110 and a secure execution environment 112 as shown in FIG. 9. The secure execution environment 112 provides a trusted execution environment (TEE) which is protected by various hardware architecture features (e.g. an MMU, bus protocol modifications for distinguishing secure and non-secure memory accesses, hardware policing of transitions between the normal and secure execution environments, etc.) which may protect code or data associated with a secure execution environment 112 from access by code running in the normal execution environment 110. An example of a hardware architecture providing such partitioning between the normal and secure execution environments is the TrustZone® architecture provided by ARM® Limited of Cambridge UK. It will be appreciated that other architectures could also be used. In systems having such a secure execution environment 112, the address layout varying process could be controlled by a trusted component 114 executing within the secure execution environment, in order to protect against potential attacks intercepting the seed value used for the address layout variation or determine which layout has been used. However this is not essential and other systems which do not have such an architecture may use our component running in a normal execution environment control address layout variation.

Figure 10:
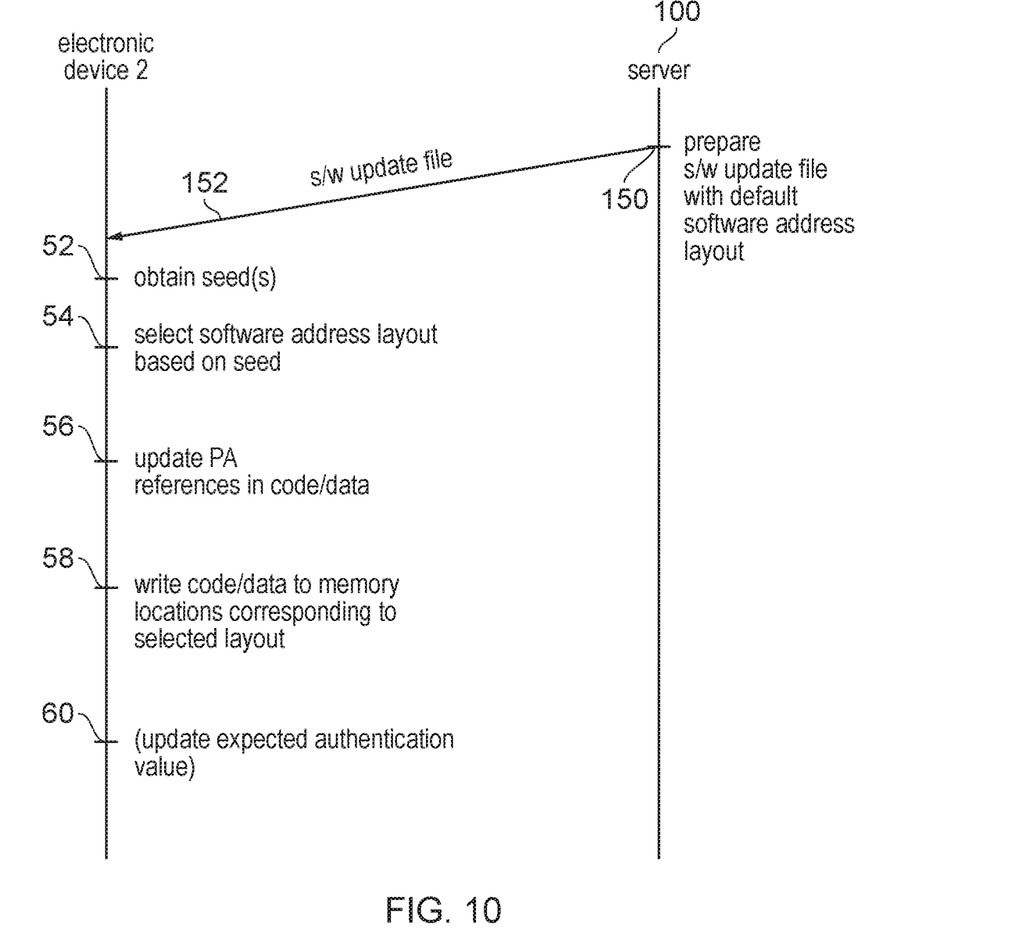
FIG. 10 illustrates an example in which the electronic device performs the address layout varying process.

FIG. 10 shows an example where the address layout varying process is performed at the electronic device. In this case the server 100 may prepare a software update file which provides the code or data to be installed or updated for a given piece of software arranged according to some default software address layout (step 150). At step 152 the server transmits the software update file to the electronic device 2. In response to receiving the software update file, the electronic device 2 performs steps 52, 54, 56 and 58 of FIG. 7 (and optionally step 60 as well), in order to select the software address layout based on the obtained seed value and write the code or data to memory locations corresponding to the selected layout. In this case, the electronic device may apply the offsets or the reordering of the code or data depending on the selected software address layout. This approach allows a server to provide the same software update file to each electronic device of a population, reducing the complexity at the server end. Also as the server is unaware of which particular software software address layout was used by any given electronic device, then this can be more secure in some scenarios.

Figure 11:
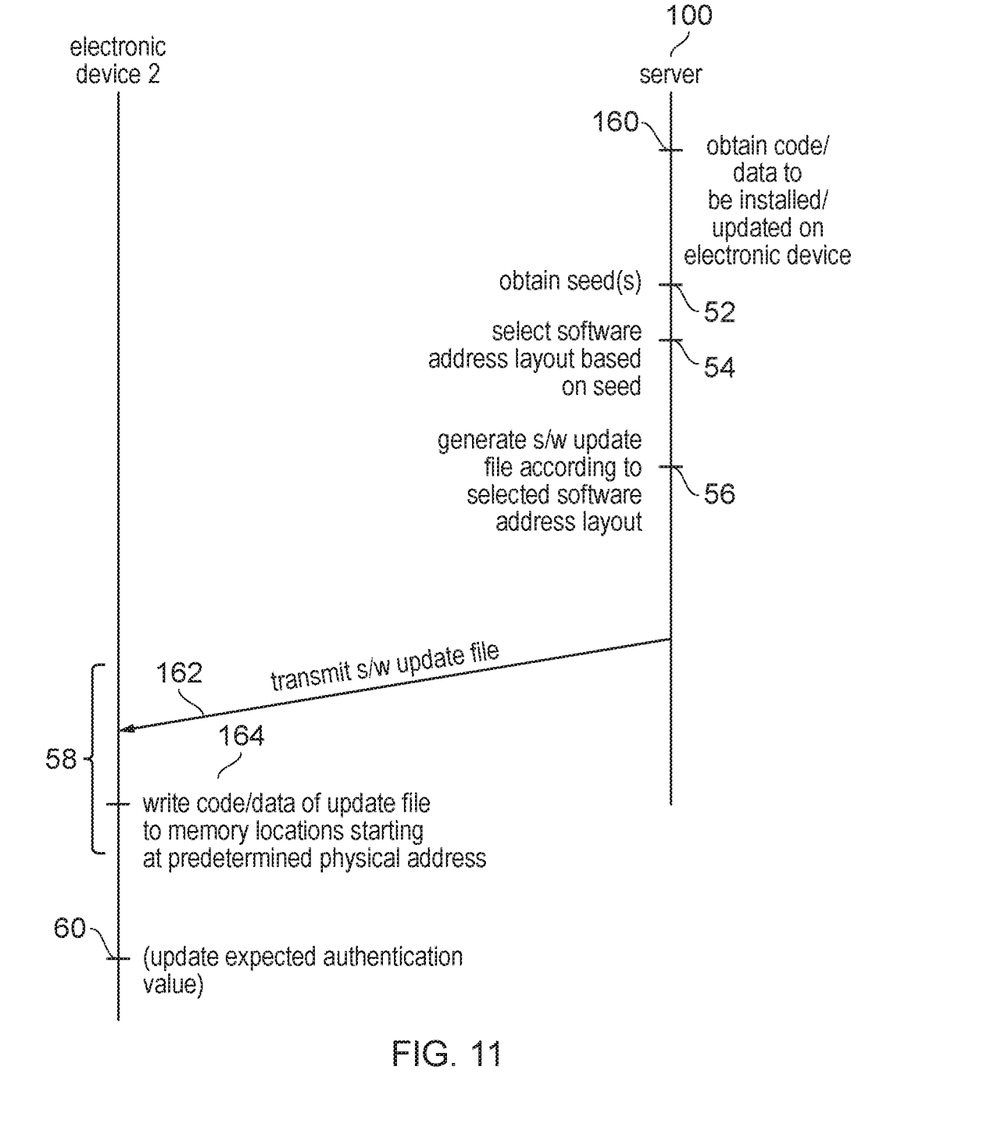
FIG. 11 shows an example where the server performs the address layout varying process.

However, as shown in FIG. 11 it is also possible for the address layout varying process to be performed at the server. In this case the server may obtain the code or data to be installed or updated on the electronic device at step 160. Also, the server may need to know what is already installed on the device and what memory is available, so can gather information on the current memory usage on the device from the device 2 itself. Then the server may perform steps 52, 54 and 56 of FIG. 7 at the server end, to obtain the seed value(s), select software address layout based on the seed value(s), and generate a software update file according to the selected software address layout. The server may perform step 58 of FIG. 7 by transmitting the generated software update file to the electronic device 2 at step 162 which then triggers the device 2 to write the code or data to the memory location starting at the predetermined physical address at step 164. Step 60 shown in FIG. 7 may still be performed at the electronic device 2 if necessary. Alternatively the expected authentication value could be provided to the electronic device 2 by the server 100.

With the approach shown in FIG. 11, the electronic device 2 does not need to have a component capable of reordering the code or data of the software and can simply install the software update file to some fixed physical address location. In cases where the address layout variation is performed as shown in FIG. 4 then the generated software update file created by the server may have the code or data in different orders for different devices. In cases where offsets are applied as shown in FIG. 3 then the server may include dummy data or padding within the software update file, so that when this is written to the corresponding locations in memory starting from some fixed default physical address, different electronic devices 2 will offset the start of the real code or data by different amounts, creating diversification in the software address layouts used by different devices 2.

Hence, an address layout varying process (diversification) could be performed off-device at a remote server that prepares software updates for the device population. Communication between the server and device may be confidential to prevent disclosing information about a particular device's memory layout to a man-in-the-middle attacker who could subsequently leverage such information to mount a targeted attack against a specific device.

In some cases, the address layout varying process could also be split between the device and the server, with some steps performed at the device and other steps performed at the server.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for installing or updating software on an electronic device comprising processing circuitry and memory access circuitry to control access to at least one memory unit in response to physically-addressed memory access requests issued by the processing circuitry specifying physical addresses from a physical address space; the method comprising performing an address layout varying process comprising:

obtaining at least one seed value;

in dependence on the at least one seed value, selecting one of a plurality of software address layouts for code or data associated with the software, each software address layout corresponding to a different layout of the code or data associated with the software in the physical address space; and triggering the electronic device to write the code or data associated with the software to locations of said at least one memory unit corresponding to the selected software address layout;

wherein the address layout varying process comprises selecting one of a plurality of address offsets in dependence on the at least one seed value, and in the selected software address layout, a start address of a region of the physical address space used to store at least part of the code or data associated with the software is offset from a base address by the selected address offset.

2. The method of claim 1, wherein the processing circuitry comprises address generating circuitry to generate non-translated physical addresses for said physically-addressed memory access requests in response to physical-address-defining operands specified by memory access instructions executed by the processing circuitry.

3. The method of claim 1, wherein the processing circuitry is configured to perform execute-in-place execution of the software from the at least one memory unit.

4. The method of claim 1, wherein the address layout varying process comprises updating at least one reference to a physical address in the code or data associated with said software to correspond with the selected software address layout.

5. The method of claim 1, wherein at least two of the plurality of software address layouts correspond to different orders in which respective portions of the code or data associated with the software are arranged within the software address layout.

6. The method of claim 1, wherein the software comprises device firmware for the electronic device.

7. The method of claim 1, wherein the software comprises monolithic software providing all the software functionality to be executed by the electronic device.

8. The method of claim 1, wherein the address layout varying process is performed when installing the software on the electronic device.

9. The method of claim 1, wherein the address layout varying process is performed when updating the software on the electronic device.

10. The method of claim 1, wherein the address layout varying process is performed when booting the electronic device.

11. The method of claim 1, wherein the at least one seed value comprises at least one of:

a random or pseudorandom number;

an identifier associated with the electronic device;

at least one hardware property of the electronic device; and a seed value provided by a further device other than the electronic device.

12. The method of claim 1, wherein the electronic device supports a software authentication function in which authenticity of the software is checked by comparing a calculated authentication value, which is obtained as a function of the code or data stored in a given region of the physical address space, with an expected authentication value; and the address layout varying process comprises updating the expected authentication value to correspond with the selected software address layout for the software.

13. The method of claim 1, wherein the address layout varying process is performed by the electronic device.

14. The method of claim 13, wherein the electronic device has a hardware architecture providing a secure operating environment and a normal operating environment, in which code and data associated with the secure operating environment are protected from access by code executed in the normal operating environment; and
the address layout varying process is controlled by code executed in the secure operating environment.

15. The method of claim 1, wherein the address layout varying process is performed by a server, which generates a software update file comprising the code or data associated with the software arranged according to the selected software address layout, and transmits the generated software update file to the electronic device to trigger the electronic device to write the code or data associated with the software to locations of said at least one memory unit corresponding to the selected software address layout.

16. A computer program for controlling a data processing apparatus to perform the method of claim 1.

17. A storage medium storing the computer program of claim 16.

18. An apparatus comprising:
processing circuitry; and
a storage medium storing a computer program for controlling the processing circuitry to perform the method of claim 1.

* * * * *